United States Patent [19]
Wallace

[11] 3,833,044
[45] Sept. 3, 1974

[54] METHOD AND APPARATUS FOR REMOVING WATER SOLUBLE WASTES OR SALTS FROM AN AQUEOUS SOLUTION

[76] Inventor: Lee J. Wallace, 6 N. Forest Cir., West Haven, Conn. 06615

[22] Filed: Jan. 8, 1973

[21] Appl. No.: 321,690

[52] U.S. Cl............ 159/8, 159/45, 159/49, 159/DIG. 28, 202/234, 202/236, 203/49, 203/DIG. 26
[51] Int. Cl............................................ B01d 1/22
[58] Field of Search .............. 210/22, 23, 321, 387; 159/8, 10, 49, 4 S, 24 A, 45, DIG. 28; 23/273 R; 202/236, 234; 203/89, 49, DIG. 26

[56] References Cited
UNITED STATES PATENTS

| | | | |
|---|---|---|---|
| 2,358,739 | 12/1967 | Pinkerton et al. ............... | 159/8 |
| 3,359,709 | 12/1967 | Revell ............................ | 210/387 X |
| 3,463,215 | 8/1969 | Pinkerton et al. ................ | 159/10 |
| 3,523,568 | 8/1970 | Leeuwen ........................ | 203/89 X |

FOREIGN PATENTS OR APPLICATIONS

| | | | |
|---|---|---|---|
| 163,549 | 5/1921 | Great Britain .................. | 159/24 A |
| 427,302 | 1/1934 | Great Britain .................. | 159/24 A |

*Primary Examiner*—Granville Y. Custer, Jr.
*Assistant Examiner*—Craig R. Feinberg
*Attorney, Agent, or Firm*—Arthur T. Fattibene

[57] ABSTRACT

A method and apparatus for removing water soluble salts from an aqueous salt solution by directing an unsaturated evaporating medium, as for example, unsaturated air, across a readily disposable, movable curtain which has been saturated with an aqueous salt solution whereby the air effects a carryoff of the moisture leaving the salt residue deposited on an expendible screen, with heat being added to the incoming air in the event the air temperature falls below 38° F wet bulb temperature and/or its relative humidity is 85 percent or more. The air laden with moisture passing through the curtain may then be passed in heat transfer relationship to a condensor whereby the moisture is condensed and the condensate collected for use as desired.

15 Claims, 4 Drawing Figures

METHOD AND APPARATUS FOR REMOVING WATER SOLUBLE WASTES OR SALTS FROM AN AQUEOUS SOLUTION

PROBLEM AND PRIOR ART

At the present time industrial waste waters containing water soluble salts, as for example sodium nitrite ($NaNO_2$) and potassium nitrate ($KNO_3$) and possibly other salt polutents resulting from various manufacturing processes are disposed by discharging such waste directly into sewer systems and/or into the neighboring streams or waterways. Waste of this type if untreated is known to be detrimental to the ecology.

The known sewerage disposal systems are capable of removal of only a portion of such contaminating substances. To minimize this polutent problem, operators of such manufacturing processes sometimes dilute the waste waters with fresh or clean water in an effort to reduce the undesirable salt concentrations to within tolerable limits. However, such dilution efforts require excessive quantities of fresh clean water, and do not constitute a real or desirable solution to the existing problem.

A preliminary search noted the following U.S. Pat. Nos.; 526,228; 744,832; 969,031; 2,034,599; 2,276,172; 3,210,260; and 3,269,920 as evidencing other methods and apparatuses for removing liquid soluble matter from its liquid solute.

Also there has been a growing need in many areas to convert sea water or brackish water to potable water, and there are known various methods and apparatuses for attaining this end. Such devices however, require periodic shut down to effect the removal of the residue salts from the surface of the evaporator and/or are considered inefficient.

The conversion of aqueous salt solutions to potable water is also currently being performed by distillation, membrane process and freezing, osmosis, and solar effect systems, with most of these systems being designed to have high productive capacities. Generally these systems are complex, costly, difficult to fabricate and complex in operation.

U.S. Pat. No. 3,399,118 describes a distillation apparatus in which potable water is converted from sea water by use of a compressed and volatized secondary heat transfer fluid. This system requires the chemical treatment of the incoming sea water and/or shut downs for periodic cleaning.

Objects

An object of this invention is to provide a method and apparatus for effecting the removal of water soluble matter from its liquid solute by evaporation whereby the solid matter is depositied or collected by an evaporation process upon a readily expendible screen or curtain.

Another object is to provide a method and apparatus in which the unwanted water soluble residue dispersed in a liquid can be readily collected in a manner to effect simple disposal thereof.

Another object is to provide an evaporating method and apparatus for extracting water soluble waste from an aqueous solution by utilizing a refrigeration system arranged to maintain a heat balance on a closed system whereby the latent heat of the condensing stage is transferred to an evaporating air stream and whereby the evaporating stage of the refrigeration system is utilized for effecting the removal of heat from the saturated air to condense the moisture carried thereby.

Another object of this invention is to provide a readily simple and inexpensive apparatus whereby water soluble salts can be readily separated from its liquid solute in a positive, efficient and practical manner.

Another object of this invention resides in a method and apparatus for separating the water soluble salts from its aqueous solution by evaporation of circulating atmospheric air.

Brief Summary of the Invention

The foregoing objects and other features and advantages are attained by a method and apparatus for removing water soluble salts from an aqueous salt solution by passing a stream of air through a movable, porous, expendible curtain or screen which has been previously saturated by drawing it through a supply of aqueous salt solution. The arrangement is such that unsaturated air directed through the porous curtain effects evaporation of the water, leaving the salt crystals embedded in the curtain, which is being progressively rolled upon a reel for subsequent disposal. The air in passing through the curtain becomes saturated and may be either vented to atmosphere or may be directed into heat transfer relationship to a condenser whereby the moisture content thereof is condensed and the air recirculated.

If recirculated, the recirculating air is passed through a heat exchanger where it is heated. The air so heated is then directed across the curtain saturated with the aqueous solution whereby the moisture content of the curtain is carried off in the air. Thus the air flow may be rendered continuous throughout the process to define a closed system with small quantities of ambient air being introduced in the system to accommodate for any leakage or loss.

The present invention further contemplates the requisite amount of heat required to be added or abstracted from the evaporating medium or air stream can be economically supplied by a refrigeration system wherein the evaporating stage of the refrigeration system is disposed in heat transfer relationship to the saturated air passing through the curtain to effect a condensation of its moisture content, and whereby the condensing stage of the refrigeration system is disposed in heat transfer relationship to the circulating cold air to effect a transfer of its latent heat to the air stream ahead of the curtain. An auxilliary condenser stage, disposed exteriorly of the system and connected in parallel to the heating condensing stage, may be provided to effect the requisite heat balance imposed on the evaporating system of this invention.

Features

A feature of this invention resides in the utilization of a readily expendible screen or curtain for retaining the water soluble residue.

Another feature resides in an evaporating method and system in which the evaporating medium is circulated in a closed system in which a refrigeration apparatus is utilized to maintain the heat balance of the system.

Another feature resides in a method and apparatus for removing water soluble waste from an aqueous solution in which atmospheric air is circulated over a porous saturated screen or curtain.

Other features and advantages will become more readily apparent when considered in view of the drawings and specification in which.

The method herein to be described is particularly applicable for effecting the removal of water soluble matter, e.g., water soluble salts from an industrial waste aqueous solution or to convert sea water or brackish water to potable water. The process is based on the ability of air to evaporate water when air is placed in intimate contact with water. Generally air in contact with water will saturate along its wet bulb temperature line; and the heat necessary to evaporate the water will result in a reduction of the air dry bulb temperature.

According to this invention a porous, and preferably a readily expendible curtain or screen is drawn through a reservoir or supply of an aqueous solution containing water soluble matter to be separated therefrom. Frequently the water soluble matter may comprise various water soluble salts, e.g., sodium nitrite ($N_2NO_2$) or potassium nitrate ($KNO_3$) which result from various industrial processes. By drawing the curtain or screen through a supply of such waste or sea water, the screen is saturated. Air is then circulated or passed through the screen to effect the evaporation of the moisture leaving the water soluble salt or residue in the screen. The quantity of air required to evaporate each pound of water from the aqueous solution which saturates the screen or curtain is determined by the entering air conditions, the quantity of air decreasing as its temperature increases or as its relative humidity decreases. In the event the entering air is less than 38° F wet bulb and/or has a relative humidity of 85 percent or more, heat is applied thereto. The heat is applied by passing the incoming air in heat transfer relationship to a heat source. The moisture laden air upon passing through the screen may be either vented to atmosphere, or passed in heat transfer relationship to a suitable condenser whereby the moisture therein can be readily condensed and collected. The residue remaining on the curtain can then be readily disposed of simultaneously with the disposal of the expendible curtain. The air, after the moisture has been condensed may be recirculated through the screen or curtain for additional passes.

The present invention further contemplates utilizing a refrigeration system to maintain a heat balance for optimum separation of water soluble matter from its liquid solute. This is attained by placing the condensing stage of the refrigerating system upstreamwise of the curtain in heat transfer relationship to the incoming air whereby the latent heat of the condensor is transferred to the incoming air. The evaporating stage of the refrigeration system is disposed downstreamwise of the saturated curtain so as to be disposed in heat transfer relationship to the saturated air passing from the screen. The passage of the saturated air over the evaporating stage of the refrigeration system results in the condensation of the moisture out of the saturated air.

Figure 1:
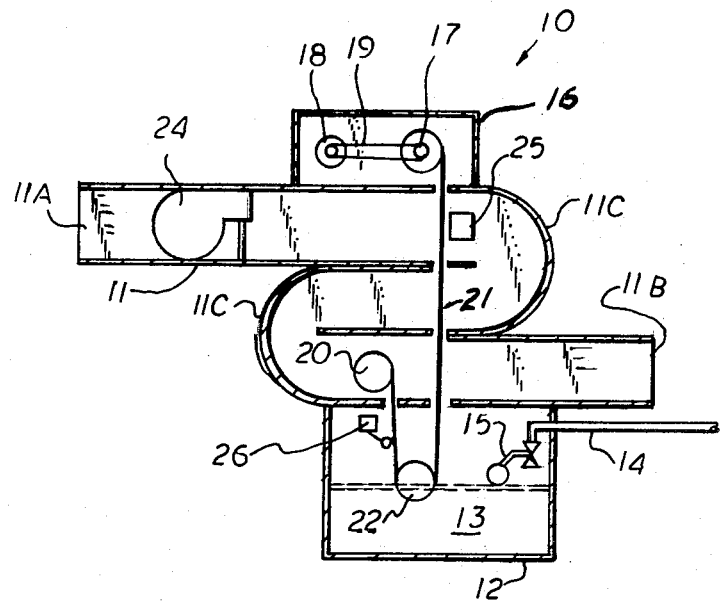
FIG. 1 is a diagramatical showing of a system or apparatus embodying the present invention.

Referring to FIG. 1 of the drawing there is illustrated an apparatus 10 by which the water soluble salts can be readily separated from an aqueous solution. The apparatus 10 comprises a duct or passageway 11 through which an evaporating medium, e.g., air, is circulated. In the illustrated embodiment the duct or passageway 11 includes an inlet end 11A which may be opened to atmosphere and through which incoming air is introduced into the passageway; and an outlet end 11B through which the saturated air may be vented to atmosphere. Intermediate the inlet and outlet ends 11A, 11B, the passageway 11 may be provided with one or more return bends 11C.

Disposed to one side of the duct or passageway 11 is a reservoir or supply chamber 12 adapted to contain a supply 13 of the aqueous solution containing the water soluble waste or salts or sea water. The aqueous solution 13 is fed into the reservoir through an infeed conduit 14, the rate of feed being controlled by a float control valve 15.

Mounted to the other side of the duct or passageway 11 is a housing 16 in which a take-up reel 17 is rotatably journalled. The take-up reel is connected in driving relationship to a motor or other suitable drive 18, e.g., by a flexible drive coupling 19.

A supply reel 20 adapted to contain thereon a roll of a porous, expendible curtain 21, is rotatably journalled in a portion of the duct opposite the take-up reel 17. A roller 22 partially submerged in the liquid supply 13 is rotatably disposed in the reservoir 12. Accordingly the porous curtain is threaded from the supply reel 20 about the idler roller 22 and about the take-up reel 17. In the illustrated embodiment the curtain 21 is threaded through appropriate slots or openings formed in the return ends of the duct so as to extend transversely to the flow of air flowing through the duct 11 as will be hereinafter described.

The curtain 21 may be formed of any suitable porous or absorbent material, e.g., woven fabric, plastic, paper, etc.; capable of being saturated with a portion of the aqueous solution 13. Thus when the motor 18 is energized the take-up reel 17 causes the curtain to be unwound from its supply reel and wound upon the take-up reel, the curtain being saturated with the aqueous solution as it is being drawn about the idler roller 22.

Incoming air is preferably induced or forced into the duct under the influence of a force draft blower or fan 24 and causes the air to flow through the respective portions of the curtain 21 traversing the reverse bend portions of the duct or passageway 11. Thus the air makes several passes over successive portions of the screen and in doing so tends to evaporate the water thereon, leaving the water soluble residue or salts on the porous screen 21.

As shown, a curtain moisture detector control 25 is wired in circuit to the motor drive 18 of the take-up reel so that the rate at which the curtain 21 is drawn through the aqueous solution is controlled by the rate at which the moisture is being evaporated from the screen 21.

A curtain detector switch 26 in the form of a feeler switch is disposed adjacent the supply reel 20 to sense the presence or absence of the curtain supply. Thus when the end or terminal portion of the curtain is unwound from the supply reel 20, the switch 26 will signal the end of the curtain by a suitable visible or audio signal thereby apprising an operator that a new curtain supply is required to be inserted into the system.

The residue laden screen is thus wound about the take-up reel, whereby the salts retained thereon can be readily disposed of together with the screen or curtain.

In this form of the invention, it will be apparent that effective separation of the water soluble matter, e.g., salt, can be readily separated from industrial waste and/or sea water by the use of ambient air in a relatively simple and effective manner.

Figure 1A:
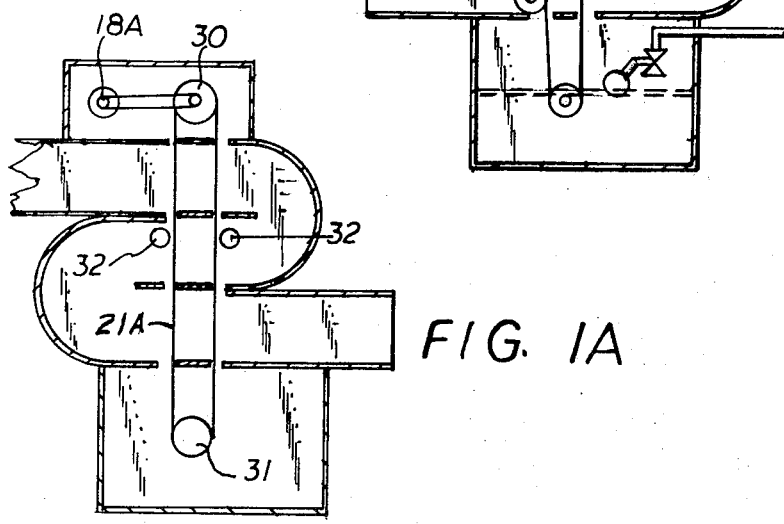
FIG. 1A is a modified form of the invention.

Referring to FIG. 1A a modified embodiment of the invention is illustrated. In this form of the invention the structure defined is similar to that described with respect to FIG. 1, except that an endless curtain or screen 21A is provided. In this embodiment the curtain 21A is threaded about opposed reels 30 and 31, the latter being partially submerged in the supply of aqueous salt solution 13 and the former being connected in driving relationship to a drive means 18A as hereinbefore described. In this arrangement, a pressure differential control means 32 is disposed adjacent the screen adjacent the upper end thereof to sense the pressure drop of the air flow across the screen. The arrangement is such that when the pressure drop through the screen reaches a predetermined value, an indication is had as to the amount of salt residue that has been built up on the curtain 21A. When sufficient residue has been deposited upon curtain 21A, it is removed and disposed of and a new curtain positioned about the reels 30 and 31.

Figure 2:
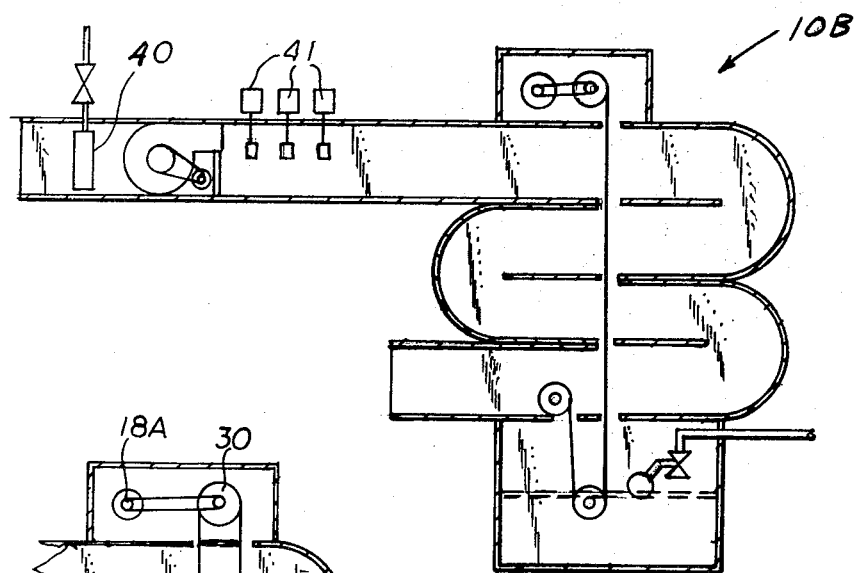
FIG. 2 is a diagramatical showing of another embodiment of this invention.

FIG. 2 illustrates still another embodiment. In this form of the invention the apparatus 10B is similar to that described with respect to FIG. 1 except that a bearing means 40 is provided adjacent the inlet end of the duct or passageway 11 to impart heat to the incoming air in the event the temperature of the incoming air is less than 38° F. wet bulb and/or its relative humidity is more than 85 percent. It will be understood that the heater 40 may comprise of any suitable heater, e.g., an electric or gas heater which may be controlled by a suitable thermostat and/or humidistat 41. The arrangement is such that approximately 10° of heat may be added to the incoming air when the relative humidity is 85 percent or more, and that no heat is required when the relative humidity is less than 85 percent and the temperature above 38° F. wet bulb. In all other respects the operation of the apparatus 10B is similar to that described with respect to FIG. 1.

It will be understood that in any of the embodiments shown with respect to FIGS. 1, 1A and 2, that the saturated air passing through the outlet end 11B of the duct may be passed over a suitable condensor (not shown) whereby the moisture therein may be condensed, and the condensate collected, prior to exhausting the air.

Figure 3:
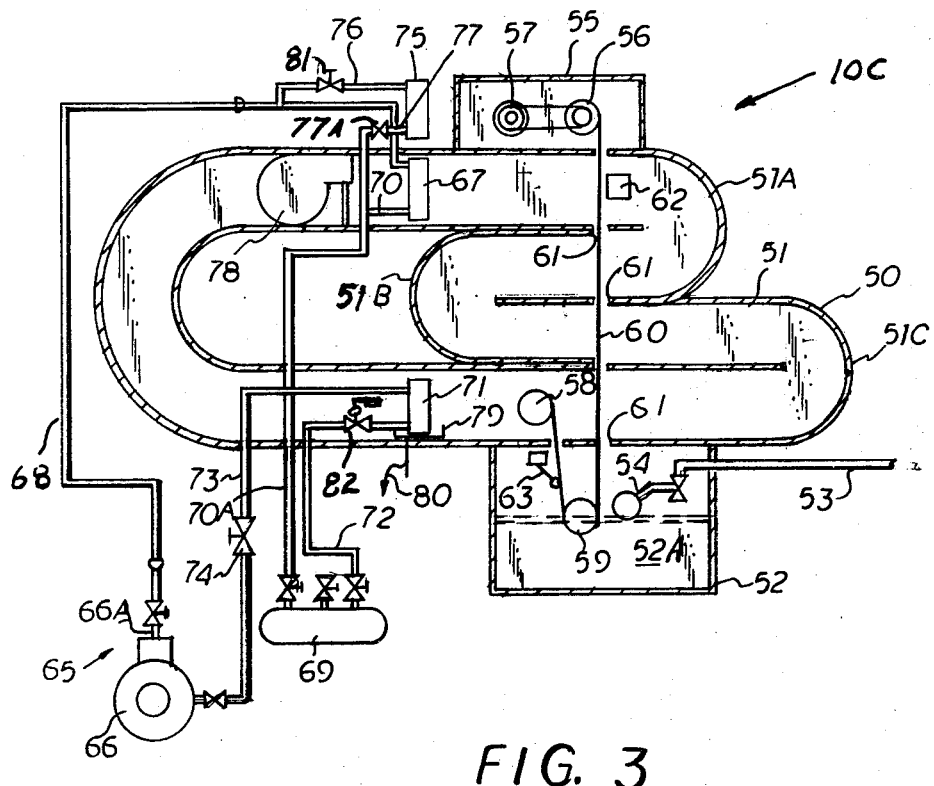
FIG. 3 is a diagramatical showing of another embodiment of this invention.

FIG. 3 illustrates another embodiment of the invention in which a refrigerating system is utilized to convert the apparatus 10C to a closed system in which the evaporating medium, e.g., air, can be continuously recycled, with only air necessary to make up for any leakage being added. In this form of the invention the duct 50 is constructed to define an endless passageway 51. As shown, one end of the closed looped passageway 51 is provided with one or more return bends 51A, 51B and 51C. Adjacent the return bend loop end of the passageway there is disposed a reservoir 52 adapted to contain the aqueous waste solution or sea water 52A.

As previously described the aqueous solution 52A is fed into the reservoir 52 through an infeed conduit 53 in which the level of solution is maintained in the reservoir by a float control valve 54.

Oppositely disposed is the reservoir 52 is a housing 55 in which a take-up reel 56 is rotatably journalled. The take-up reel is connected in driving relationship to a suitable drive means 57, e.g., a motor.

Oppositely disposed to the take-up reel 56 is a supply reel 58. Intermediate the supply reel 58 and the take-up reel is an idler reel 59 which is partially submerged in the reservoir liquid 52A. As previously described a porous or absorbent expendible curtain or screen 60 is threaded from about the idler reel 59 in passing between the supply reel 58 and the take-up reel 56. As described with respect to FIG. 1, the curtain 60 is threaded through appropriate slots or openings 61 formed in the return bends so as to extend transversely to the flow of air through the passageway.

A moisture detector control 62 is disposed adjacent the curtain and it is connected in circuit to the drive means 57 to control the speed of the curtain. The arrangement is such that the speed of the curtain is controlled by the rate of evaporation of moisture. Thus the faster the moisture is evaporated from the curtain by the flow of air therethrough, the faster is the rate of take-up of the curtain. Conversely, the slower the rate of evaporation, the slower the movement of the curtain.

A curtain detection switch 63 in the form of a feeler switch is disposed adjacent the supply reel 58 to sense the presence or absence of the curtain 60. As described when the terminal end of the curtain has passed the curtain detection switch 63, an appropriate signal will be given to apprise an operator that a new curtain supply is required.

In this form of the invention a refrigeration system is utilized to maintain the appropriate heat balance for optimum effectiveness of the overall apparatus. As shown the refrigeration system 65 includes a compressor 66 disposed exteriorly of the passageway 50. The condensing stage or condensor 67 of the refrigeration system is disposed in the passageway 51 on the upstreamside of the curtain 60, the refrigerant being circulated from the compressor 66 to the condensing stage 67 through connecting conduit or piping 68. The outlet of the condensing stage 67 connects with the reservoir or supply tank 69 of the refrigerant by conduits 70 and 70A.

The evaporating stage or evaporate 71 of the refrigerating system 65 is disposed in the passageway 51 on the downstreamside of the curtain 60; and it is connected to the refrigerant supply tank 69 by connecting conduit 72 which includes a thermal expansion valve 82. The outlet of the evaporator 71 is connected to the compressor inlet by conduit 73, and evaporator pressure regulating valve 74 being disposed in conduit 73.

An auxiliary condensor 75 is connected in parallel to condensor 67 and is disposed to an external side of the duct or passageway 51. As shown, a branch conduit 76 connects the condensor 75 to the refrigerant supply line 68 and a branch conduit 77, including a check valve 77A connects the outlet of the condensing stage 75 to the refrigerant supply tank 69.

To enhance the flow of air through duct or passageway is a force draft fan or blower 78.

Disposed adjacent the evaporating stage 71 of the refrigerating system is a collector 79 to collect the condensate which is condensed out of the air as will be herein described. A drain or outlet 80 is connected to the collector for draining off the water condensate.

In operation, the circulating air in the closed loop or passageway 51 is alternately heated and cooled by the condensing and evaporating stages of the refrigeration system. The arrangement is such that the compressor 66 directs the refrigerant, which is in a gaseous state to the condensor 67 wherein the refrigerant condenses, liberating heat which in turn is transmitted to the air to increase the temperature thereof. The air so heated is then directed in several passes over the screen which has been saturated with the aqueous salt solution by drawing it through the aqueous solution. In doing so the moisture retained by the screen or curtain 60 is evaporated, the residue salt being retained on the porous curtain 60.

As described the screen is being rolled upon the takeup reel 56 at a rate proportional to the speed at which the moisture is being evaporated therefrom.

As the moisture laden air passes through the screen it is passed in heat transfer relationship to the evaporating stage 71 of the refrigeration system. In doing so the heat of the moisture laden air is absorbed by the evaporating stage 71 thereby lowering the temperature of the air to below its dew point causing the moisture to be condensed. The condensing moisture is accummulated in collector 79 from which it is readily drained through conduit 80. The residue salt being retained on the screen 60 is rolled about the take-up reel, whereby it can be readily disposed by removal and discarding of the salt laden screen.

The auxilliary condensor stage 77 is provided and arranged to dissipate the unbalanced heat on the system. A suitable discharge pressure regulating valve 81 is disposed in the branch conduit 76 to control or proportion the flow of refrigerant between condensor stages 67 and 75 to control the heat balance of the system accordingly.

In the system illustrated in FIG. 3 it will be understood that small quantities of ambient air may be introduced into the system to accommodate or make-up for any air leakage which may occur during operation.

The heat removed and supplied to the circulating air can be economically supplied by the refrigeration system described in which the refrigerant is vaporized in the cooling heat exchanger or evaporating stage for effecting removal of the heat from the moisture laden air to result in condensing of the moisture carried thereby and whereby the gaseous refrigerant is subsequently compressed and allowed to condense in the heat exchange or condensing stage 67 whereby the latent heat is transferred to the circulating air stream to heat the same ahead of the curtain 60.

The return bend of the loops defined enables any dry salt particles which might become dislodged from the curtain by the flow of air therethrough on the upper or dryer portion thereof to be carried in the air stream to the next lower curtain sector whereby the dislodged particles can be captured or adhered to the more moist portion of the curtain; or if they pass through the intermediate portion of the screen, to be captured by the lowermost section of the screen which is wet.

While the present invention has been described with respect to various embodiments thereof, it will be readily appreciated and understood that variations and modifications may be made without departing from the spirit or scope of the invention.

What is claimed is:

1. A system for removing water soluble salts from an aqueous salt solution comprising:
   reservoir means for containing a supply of said solution,
   a readily disposable, porous curtain,
   means for drawing said curtain at a predetermined rate through said solution whereby said curtain is saturated with said solution,
   said means for drawing the curtain comprising a pair of spaced apart reels,
   one of said reels being disposed in said reservoir means,
   said curtain being wound about said reels,
   means for effecting the drive of one of said reels for drawing said curtain through the aqueous salt solution,
   and means for directing an evaporating medium over said curtain as it emerges from said solution to effect the evaporation of the moisture content thereof to result in the residue salt crystals remaining enmeshed in the curtain,
   said directing means comprising a duct defining a passageway, said duct having at least one return bend,
   said screen being drawn transversely across said return bend,
   and means for forcing said evaporating medium through said passageway and through said curtain being drawn transversely across said return bend.

2. A system for removing water soluble salts out of an aqueous salt solution comprising:
   duct means defining an endless closed passageway through which an evaporating medium is circulated,
   a reservoir adapted to contain a supply of aqueous salt solution disposed adjacent said passageway means,
   a porous curtain,
   means for drawing said curtain through said salt solution supply and thereafter across said passageway means,
   circulating means for effecting the circulation of said evaporating medium through said curtain to evaporate the moisture therefrom,
   a refrigeration means,
   said refrigeration means including a condensator disposed upstreamwise of said curtain,
   and an evaporator disposed downstreamwise of said curtain, and a compressor operatively connected to said condensor and evaporator,
   and including an auxilliary condensor disposed in parallel to said first mentioned condensor.

3. A system for removing water soluble salts out of an aqueous salt solution comprising:
   duct means defining an endless closed passageway through which an evaporating medium is circulated,
   a reservoir adapted to contain a supply of aqueous salt solution disposed adjacent said passageway means,
   a porous curtain, means for drawing said curtain through said salt solution supply and thereafter across said passageway means, circulating means for effecting the circulation of said evaporating medium through said curtain to evaporate the moisture therefrom, a refrigeration means, said refrigeration means including a condensator disposed upstreamwise of said curtain, and an evaporator disposed downstreamwise of said curtain, and a compressor operatively connected to said condensor and evaporator, wherein said passageway means includes an endless duct having a series of return bend portions to define a zig-zag passage for the flow of evaporating medium therethrough, and said curtain being drawn across each leg of said zig-zag passageway.

4. A system for removing water soluble salts from an aqueous salt solution and comprising:

a closed loop defining a passageway having a plurality of return bends disposed at one end of said loop, a reservoir disposed adjacent said closed loop adapted to contain a supply of said aqueous salt solution, a readily disposable porous curtain, means for drawing said curtain through said reservoir and across the return bends, said drawing means comprising a take-up reel disposed adjacent one end portion of said passageway, a supply reel spaced therefrom and disposed adjacent an opposite end portion of said passageway, and an immersion reel disposed in said reservoir, said curtain being threaded about said reels, and a motor means connected in driving relationship to said take-up reel, means for circulating air through said closed loop, and a refrigeration means operatively associated with said passageway for effecting the heat removal and supply to the circulating air so as to maintain the heat balance of the system for optimum efficiency, said refrigerating means including a compressor remotely disposed from said passageway, a condensor operatively connected to said compressor, said condensor being disposed in said passageway upstreamwise of said curtain for supplying heat to said circulating air by direct heat transfer, and an evaporator operatively connected to said compressor disposed in said passageway downstreamwise of said curtain for abstracting heat from said circulating air by direct heat transfer and thereby effecting the condensation of the moisture contained in said air, and including a second condensor connected in parallel to said first mentioned condensor, said second condensor being disposed exteriorly of said passageway, and said second condensor dissipating the unbalance heat of said system.

5. A system for removing water soluble salts from an aqueous salt solution comprising:

reservoir means for containing a supply of said solution.

a readily disposable, porous curtain, means for drawing said curtain at a predetermined rate through said solution whereby said curtain is saturated with said solution, and means for directing an evaporating medium over said curtain as it emerges from said solution to effect the evaporation of the moisture content thereof to result in the residue salt crystals remaining enmeshed in the curtain, said directing means comprises a duct defining a passageway, said duct including at least one return bend, and said screen being drawn transversely across said return bend, and means for forcing said evaporating medium through said passageway.

6. The invention as defined in claim 5 and including means for heating said evaporating medium prior to passing through said saturated curtain.

7. The invention as defined in claim 5 and including a condensation means disposed downstreamwise of said curtain means for condensing the moisture out of the air upon passing through said screen.

8. A system for removing water soluble salts from an aqueous salt solution comprising:

a duct defining passageway in which a gaseous evaporating medium is circulated, a reservoir means disposed adjacent to said passageway, said reservoir being adapted to contain a supply of an aqueous solution containing a water soluble salt, a readily disposable porous curtain, means for drawing said curtain through the aqueous solution to saturate said curtain with said solution and across said passageway, means for directing the gaseous evaporating medium through said passageway and through the saturated curtain being drawn transversely of said passageway for evaporating the moisture out of said saturated curtain, a refrigerating means having a condensing stage and an evaporating stage, said condensing stage being disposed in said passageway on the upstream side of said curtain, and said evaporating stage being disposed in said passageway on the downstream side of said curtain whereby said evaporating means is directed through said passageway in direct heat transfer relationship with said condensing stage and evaporating stage of said refrigerating means.

9. The invention as defined in claim 8 and including a moisture controller disposed adjacent said curtain being drawn transversely of said passageway, said moisture controller being operatively connected to said curtain drawing means for controlling the rate at which said curtain is being drawn across said passageway.

10. The invention as defined in claim 8 wherein said duct includes at least one return bend, and said curtain is drawn transversely across said return bend.

11. The invention as defined in claim 10 wherein said duct defines an endless closed passageway.

12. A system for removing water soluble salts from an aqueous salt solution and comprising:

a closed loop defining a passageway having a plurality of return bends disposed at one end of said loop, a reservoir disposed adjacent said closed loop adapted to contain a supply of said aqueous salt solution, a readily disposable porous curtain, means for drawing said curtain through said reservoir and across the return bends, said drawing means comprising a take-up reel disposed adjacent one end portion of said passageway, a supply reel spaced therefrom and disposed adjacent an opposite end portion of said passageway, and an immersion reel disposed in said reservoir, said curtain being wound about said take-up reel, as said curtain is drawn through said reservoir, and a motor means connected in driving relationship to said take-up reel, means for circulating air through said closed loop, and a refrigeration means operatively associated with said passageway for effecting the supply and removal of heat by direct heat transfer with the circulating air so as to maintain the heat balance of the system for optimum efficiency.

13. The invention as defined in claim 12 wherein said refrigeration means includes:

a compressor remotely disposed from said passageway, a condensor operatively connected to said compressor, said condensor being disposed in said passageway upstreamwise of said curtain for supply heat to said circulating air, by direct heat transfer, and an evaporator operatively connected to said compressor disposed in said passageway downstreamwise of said curtain abstracting heat from said circulating air by direct heat transfer and thereby effecting the condensation of moisture contained in said air.

14. A method for removing water soluble salts from an aqueous salt solution comprising the steps of:

maintaining a supply of said aqueous salt solution, drawing a readily disposable porous curtain through said solution, effecting a drying of the wetted portion of said curtain by blowing air therethrough to effect an evaporation of the moisture contents whereby the salt crystals remain enmeshed in said curtain, utilizing a refrigerating system for maintaining the heat balance on said salt removal system by disposing the heat producing condensing phase of said refrigeration system in direct heat transfer relationship with the air on the upstreamside of the curtain to heat the drying air and by disposing the evaporator heat absorbing phase of said refrigeration system in direct heat transfer with the moisture laden air passing through the curtain on the downstream side of the curtain, and disposing of said salt encrusted curtain.

15. A method for removing water soluble salts from an aqueous salt solution comprising the steps of:

maintaining a supply of said aqueous salt solution, drawing a readily disposable porous curtain through said solution, effecting a drying of the wetted portion of said curtain by blowing air therethrough to effect an evaporation of the moisture content whereby the salt crystals remain enmeshed in said curtain, utilizing a refrigeration system for maintaining the heat balance on said salt removal system by disposing the heat producing condensing phase of said refrigeration system on the upstream side of the curtain to heat the drying air and the evaporator heat absorbing phase of said refrigeration system on the downstream side of the curtain, dissipating the unbalanced heat of the salt removal system by utilizing a second condensing phase, and disposing of said salt encrusted curtain.

* * * * *